(12) United States Patent
Minami

(10) Patent No.: US 7,370,474 B2
(45) Date of Patent: May 13, 2008

(54) EXHAUST GAS PURIFYING EQUIPMENT FOR A DIESEL ENGINE

(75) Inventor: Toshitaka Minami, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 905 days.

(21) Appl. No.: 10/699,664

(22) Filed: Nov. 4, 2003

(65) Prior Publication Data

US 2004/0096372 A1   May 20, 2004

(30) Foreign Application Priority Data

Nov. 15, 2002 (JP) .............................. 2002-332369
Nov. 15, 2002 (JP) .............................. 2002-332382

(51) Int. Cl.
*F01N 3/00* (2006.01)

(52) U.S. Cl. .............................. 60/295; 60/286; 60/287; 60/288; 60/297; 60/311

(58) Field of Classification Search .................. 60/285, 60/286, 287, 288, 295, 297, 300, 311, 324, 60/303
See application file for complete search history.

(56) References Cited

U.S. PATENT DOCUMENTS

| | | | | |
|---|---|---|---|---|
| 4,485,621 A * | 12/1984 | Wong et al. | ................... | 60/274 |
| 4,686,827 A * | 8/1987 | Wade et al. | ................... | 60/286 |
| 5,067,319 A * | 11/1991 | Moser | .......................... | 60/288 |
| 5,771,683 A * | 6/1998 | Webb | .......................... | 60/274 |
| 6,598,387 B2 * | 7/2003 | Carberry et al. | .............. | 60/297 |
| 6,807,807 B2 * | 10/2004 | Kagenishi | .................... | 60/288 |
| 6,883,310 B2 * | 4/2005 | Nakatani et al. | ............... | 60/288 |
| 6,971,230 B1 | 12/2005 | Bluhm et al. | | |
| 2006/0242947 A1 * | 11/2006 | Kay et al. | ...................... | 60/284 |

FOREIGN PATENT DOCUMENTS

| | | |
|---|---|---|
| JP | 7-189656 | 7/1995 |
| JP | 8-319820 | 12/1996 |
| WO | WO 01/33051 | 5/2001 |

\* cited by examiner

*Primary Examiner*—Tu M. Nguyen
(74) *Attorney, Agent, or Firm*—Staas & Halsey LLP

(57) ABSTRACT

An exhaust gas purifying equipment for a diesel engine having a first continuous regeneration type DPF (12) in an exhaust passage (7) of an engine (2), a second continuous regeneration type DPF (13) in a bypass passage (101), a switching valve (102) for switching the flow path of an exhaust gas, an exhaust temperature raising means, an exhaust temperature area detector, and a controller controlling the exhaust temperature raising means and the switching valve (102), wherein the controller operates the exhaust temperature raising means and at the same time executes the post-injection, and, furthermore, controls the switching valve (102) so that the exhaust gas passes through the second continuous regeneration type DPF (13), in the case where the exhaust temperature area of an engine (2) detected by the exhaust temperature area detector is in an extremely low temperature area (Z2) of which the exhaust temperature is lower than that of a predetermined temperature area.

Thereby, even under an environment such as a very cold land, the PM collected by the DPF can be made burn steadily and continuously over the whole operating range of an in-vehicle diesel engine.

5 Claims, 11 Drawing Sheets

Exhaust temperature area map

Fig.7

Exhaust temperature area control map

| Area | | Intake valve | Exhaust valve | Switching valve | EGR valve | Post-Injection |
|---|---|---|---|---|---|---|
| X | | Full open | Full open | Full open | Full close | No |
| Y | | Full open | Full open | Full open | Open | No |
| Z | Z1 | Opening control of intake valve opening map | Opening control of exhaust valve opening map | Close | Open | No |
| | Z2 | | | | | Yes |

(a) Intake valve opening map (b) Exhaust valve opening map

EXHAUST GAS PURIFYING EQUIPMENT FOR A DIESEL ENGINE

BACKGROUND OF THE INVENTION

The present invention concerns an exhaust gas purifying equipment for removing a particulate in the exhaust gas of diesel engines.

Regulations on the exhaust gas of recent internal combustion engines, especially diesel engines are further reinforced year by year, and, in particular, it has become urgent to reduce particulate matter (PM, hereinafter) containing mainly carbon. The diesel particulate filter (DPF, hereinafter) is known as a equipment for removing this PM from the exhaust. In addition, the movement to enforce equipping a vehicle having a diesel engine with a DPF is becoming a reality.

However, as the collected PM would accumulate in the DPF to be provided on a vehicle having a diesel engine due to a repeated driving of the engine, it is necessary to regenerate the DPF by burning the collected PM. As this regeneration means, methods for burning PM by heating with an electric heater or a burner and so on are known.

In the case of adoption of this method for burning PM, because it is impossible to collect PM during the regeneration of the DPF by burning PM again, the system becomes larger in scale through collecting and burning alternately by disposing a plurality of DPFs in the exhaust passage. Moreover, securing the durability of the filter becomes problematic, as the temperature becomes high during the PM burning. For these reasons, this method has not come to be widely adopted.

With these problems as a background, in recent years a method of burning the collected PM continuously by means of active oxygen generated during the occlusion and reduction of NOx by supporting a NOx occlusion reduction type catalyst as shown in the Japanese Patent Publication No. 2600492 (p. 3 to p.6) with the DPF has appeared, and is known as an exhaust gas purifying equipment for a diesel engine. Besides, a method for a providing oxidation catalyst upstream of the DPF as shown in Patent Publication No. 3012249(p.2, p.3) is also known.

An exhaust gas purifying equipment for a diesel engine, equipped with a conventionally known continuous regeneration type diesel particulate filter (continuous regeneration type DPF, hereinafter) is shown in FIG. 12. Now, on the basis of FIG. 12, the exhaust gas purifying equipment for a diesel engine provided with a continuous regeneration type DPF shall be described.

An intake manifold 3 composing a part of an intake passage and an exhaust manifold 4 composing a part of an exhaust passage are provided with an engine main body 2 being composed by a cylinder block and cylinder head and so on. An intake pipe 5 composing a part of the intake passage is connected to the intake manifold 3, and an air cleaner 6 for cleaning suction intake air is arranged at the furthest upstream section of this intake pipe 5. The suction air cleaned by the air cleaner 6 passes through the intake pipe 5 and is delivered to the inside of a cylinder (not shown) through the intake manifold 3. An exhaust pipe 7 composing a part of the exhaust passage is connected to the aforementioned exhaust manifold 4. And the exhaust gas produced in the cylinder is emitted through the exhaust manifold 4 and the exhaust pipe 7.

The illustrated diesel engine is provided with a turbocharger 8 for supercharging suction air. This turbocharger 8 has an exhaust turbine 81 arranged in the exhaust pipe 7 and an intake compressor 82 arranged in the intake pipe 5. In addition, the illustrated diesel engine comprises an exhaust gas recirculate (EGR hereinafter) passage 9 for connecting the exhaust pipe 7 at an upstream potion of the aforementioned exhaust turbine 81 and the intake pipe 5 at a downstream potion of the aforementioned intake compressor 82.

An EGR valve 11 is arranged in the EGR passage 9. This EGR valve 11 being provided with a negative pressure actuator connected, for example, to a negative pressure tank (not shown), the degree of valve-opening thereof(that is, the EGR rate) is controlled by controlling the negative pressure quantity to be supplied according to the driving state by control means 10 mentioned below.

As is well known, the EGR is an exhaust purifying means intended to reduce NOx by inputting suction air containing the recirculative exhaust gas being made to recirculate into the cylinder. The exhaust gas exhausts after combustion. About the connection of the EGR passage and the engine side, the EGR passage connects the intake passage with the exhaust passage in this example of the prior art, it is evident that the intake manifold composing a part of the intake passage can be replaced of the intake passage and that the exhaust manifold composing a part of the exhaust passage can be replace of the exhaust passage.

A continuous regeneration type DPF 12 having an oxidation catalyst 121, a DPF 122 and NOx catalyst 14 in that order from the upstream side, is arranged in the exhaust pipe 7 downstream of the aforementioned exhaust turbine 81.

As the oxidation catalyst 121, for example, those catalysts where a wash coat layer is formed by coating the surface of a carrier made of honeycomb-shaped cordierite or heat-resistant steel with active alumina or the like, this coat layer being made to support a catalyst active component made of rare metal such as platinum, palladium, or rhodium and so on, are used. At this oxidation catalyst 121, $NO_2$ is produced by oxidation of NO in the exhaust gas and, at the same time, $H_2O$ and $CO_2$ are produced by oxidation of HC and CO in the exhaust gas.

The DPF 122 is made of for example porous cordierite or silicon carbide. Alternatively, a honeycomb filter of the so-called wall-flow type or a fabric type filter is used for DPF 122. In the honeycomb filter, a number of cells are formed in parallel, and inlets and outlets of the cells are sealed alternately as a check pattern. And in the fabric type filter, ceramic fiber is wound around a stainless steel porous pipe in a number of layers. In this case this DPF 122 collects PM in the exhaust gas.

The same as the composition and components of the aforementioned oxidation catalyst 121 can be used as those of this NOx catalyst 14. Here, this NOx catalyst 14 reduces NOx such as NO and so on in the exhaust gas to $N_2$ or $H_2O$. Thus, the continuous regeneration type DPF 12 is composed of at least the oxidation catalyst 121 and DPF 122 as mentioned above. And NO in the exhaust gas is then oxidized to $NO_2$ by the oxidation catalyst 121, and PM collected in the DPF 122 is oxidized and burned with $NO_2$ flowing in the DPF 122 arranged downstream of the oxidation catalyst 121.

In this system, it is unnecessary to provide special heating means such as electric heater, burner and so on, because, at this time, PM burns at a low temperature equal or inferior to 400° C. In addition, this fact presents the advantage of making the whole system simple and compact, because PM is collected at the same time as producing continuously the combustion of PM at a low temperature.

The illustrated diesel engine comprises an engine speed detection sensor 15 for detecting the engine speed, an accelerator sensor 16 for detecting the accelerator pedal application amount (accelerator opening=ACL), an intake temperature sensor 17 for detecting the temperature of the intake air sucked into the cylinder, and a control means 10 for controlling the fuel injection quantity to be injected into the cylinder. The intake temperature sensor 17 is arranged in the intake manifold 3. The control means 10 controls the fuel injection quantity by the aforementioned EGR valve 11, a fuel injection unit (not shown) based on detection signals from the engine speed detection sensor 15, an accelerator sensor 16 and intake temperature sensor 17 and so on.

The control means 10 has a memory which stores the date of a so-called fuel injection quantity as shown in FIG. 15 for setting the fuel injection quantity taking the engine speed and the accelerator opening as parameters. And the control means 10 calculates the fuel injection quantity on the basis of detection signals from the engine speed detection sensor 15 and the accelerator sensor 16. Then the control means 10 corrects the basic fuel injection quantity based on the detection value of the intake temperature sensor 15, and calculates the final fuel injection quantity. It should be appreciated that the final fuel injection quantity can be corrected from time to time by referring not only to the intake temperature but also to various other parameters (atmospheric pressure, smoke limit injection quantity and so on).

The efficiency of the reaction for oxidizing NO to $NO_2$ in the aforementioned oxidation catalyst 121, the so-called "transformation rate", varies largely according to the catalyst temperature in catalysts under the present. For example, though a satisfactory oxidation reaction can be observed in the active area between 250° C. and 400° C., NO is not transformed satisfactorily to $NO_2$ in the other areas. In other words, $NO_2$ is not generated enough to oxidize PM.

FIG. 13 shows the exhaust quantity of $CO_2$ that is generated by the oxidation burning of PM in relation to the exhaust temperature (the temperature of the exhaust gas) of the engine. Observing this, one can understand that PM burns actively and the filer is regenerated between 250° C. and 400° C. Adversely, PM burning, namely DPF regeneration, hardly occurs in the other temperature areas. In other words, PM arrives to be collected continuously by the DPF without regenerating the DPF. In a state such as where a great quantity of PM is accumulated, if PM burning occurs, the burning progresses in a moment to causing considerable deterioration of filter durability or other problems.

In the case of a diesel engine to be mounted on a vehicle, an engine speed and an engine load change every second according to the operating state, and the temperature of the exhaust gas discharged form the engine also changes according to the operating state. FIG. 14 shows the exhaust temperature area taking an engine speed and an engine load as the parameter. As it can be understood also from FIG. 14, when both the engine load and the engine speed are high or low, the catalyst temperature is out of the active temperature area (from 250° C. to 400° C.), therefore NO is not sufficiently oxidized to $NO_2$ in the oxidation catalyst. Hence the PM collected by the DPF is does not burn sufficiently and consequently the PM collection efficiency of the filter also lowers. As a result, the filter itself becomes clogged early, or causing other unfavorable results. Furthermore, even if the exhaust temperature is within the catalyst active temperature area, in the case that the exhaust temperature is at the lower area, sometimes it results in being lowered below the active temperature area, because the heat of the exhaust gas is radiated to the atmosphere or others, in the course from the exhaust manifold to the oxidation catalyst.

And, especially in an environment such as a very cold land and a highland, it is a difficult to burn and remove the collected PM completely, in any operating range.

Though the aforementioned prior art has been described taking the continuous regeneration type DPF composed of an oxidation catalyst and a diesel particulate filter as an example, the same problem also occurs in a method for burning the collected PM continuously using the active oxygen generated through the occlusion and the reduction of NOx by supporting the NOx occlusion reduction type catalyst on the DPF, because the temperature area where the catalyst functions effectively is limited.

BRIEF SUMMARY OF THE INVENTION

The present invention is devised in view of the foregoing points and the object is to provide an exhaust gas purifying equipment for a diesel engine that can burn PM collected by the DPF steadily and continuously over the whole operating range of the diesel engine mounted in a vehicle, even under the environment such as a very cold land and a highland.

In order to solve the aforementioned technical problems, according to the present invention, the exhaust gas purifying equipment for a diesel engine comprising a first continuous regeneration type diesel particulate filter disposed in the exhaust passage of an engine, a bypass passage bypassing the exhaust passage at the upstream of the first continuous regeneration type diesel particulate filter, a second continuous regeneration type diesel particulate filter disposed in the bypass passage, a switching valve (change-over valve) for switching a flow path of an exhaust gas disposed in the exhaust passage between the bypass passages, an exhaust temperature raising means for raising the exhaust temperature (the temperature of exhaust gas) of the engine, an exhaust temperature area detection means for detecting the exhaust temperature area of the engine and control means for controlling the exhaust temperature raising means and the switching valve in correspondence to the exhaust temperature area of the engine detected by the exhaust temperature area detection means, wherein the control means operates the exhaust temperature raising means and, at the same time execute the post-injection, and, furthermore, controls the switching valve so that the exhaust gas passes through the second continuous regeneration type diesel particulate filter, in the case where the exhaust temperature area of the engine detected by the exhaust temperature area detection means is an extremely low temperature area lower than a predetermined temperature area.

Then, the control means is preferably made in a way as to operate the exhaust temperature raising means and at the same time to control the switching valve so that the exhaust gas passes through the second continuous regeneration type diesel particulate filter, in the case where the exhaust temperature area of the engine detected by the exhaust temperature area detection means is in the low temperature area but in the area where the exhaust temperature is higher than the exhaust temperature in extremely low temperature area.

The aforementioned post-injection is preferably executed in a range of 80° BTDC to 120° BTDC and, moreover, in the aforementioned post-injection, it is preferable to set the post-injection quantity from 10% to 20% of the main injection quantity.

According to the exhaust gas purifying equipment for a diesel engine based on the present invention, it became possible to collect PM and regenerate continuously the DPF without lowering, by the atmosphere and the like, the exhaust temperature raised by the exhaust temperature raising means, as the exhaust temperature is raised by the exhaust temperature raising means and, at the same time, is passed through the second continuous regeneration type DPF. The capacity of this second DPF is smaller than that of the conventional first continuous regeneration type DPF. And the second DPF is disposed at the upstream of the first DPF, separately from the first DPF.

And, furthermore, the exhaust temperature can be raised, as the post-injection control is performed, in the case where the exhaust temperature area is especially in the extremely cold temperature area in the cold temperature area, during an idling driving or an extremely light load driving in a very cold land, a highland and the like. Consequently, it becomes possible to burn and remove PM collected in the DPF, over the whole operating range of the engine.

BRIEF DESCRIPTION OF DRAWINGS

FIG. 7 shows control maps for respective exhaust temperature areas according to the present invention;

DETAILED DESCRIPTION OF THE INVENTION

Figure 1:
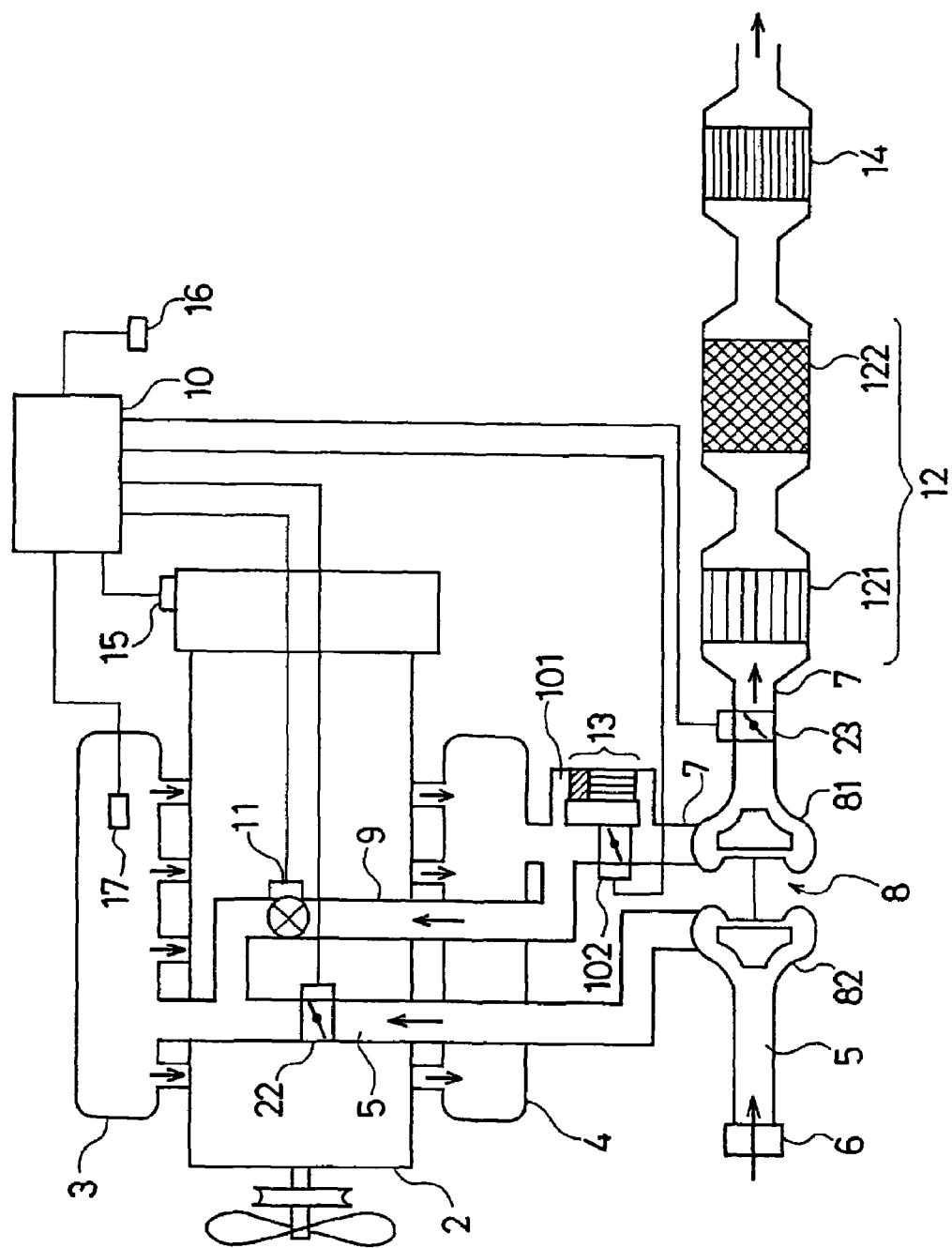
FIG. 1 shows the block diagram of an exhaust gas purifying equipment for a diesel engine according to the present invention.
Figure 12:
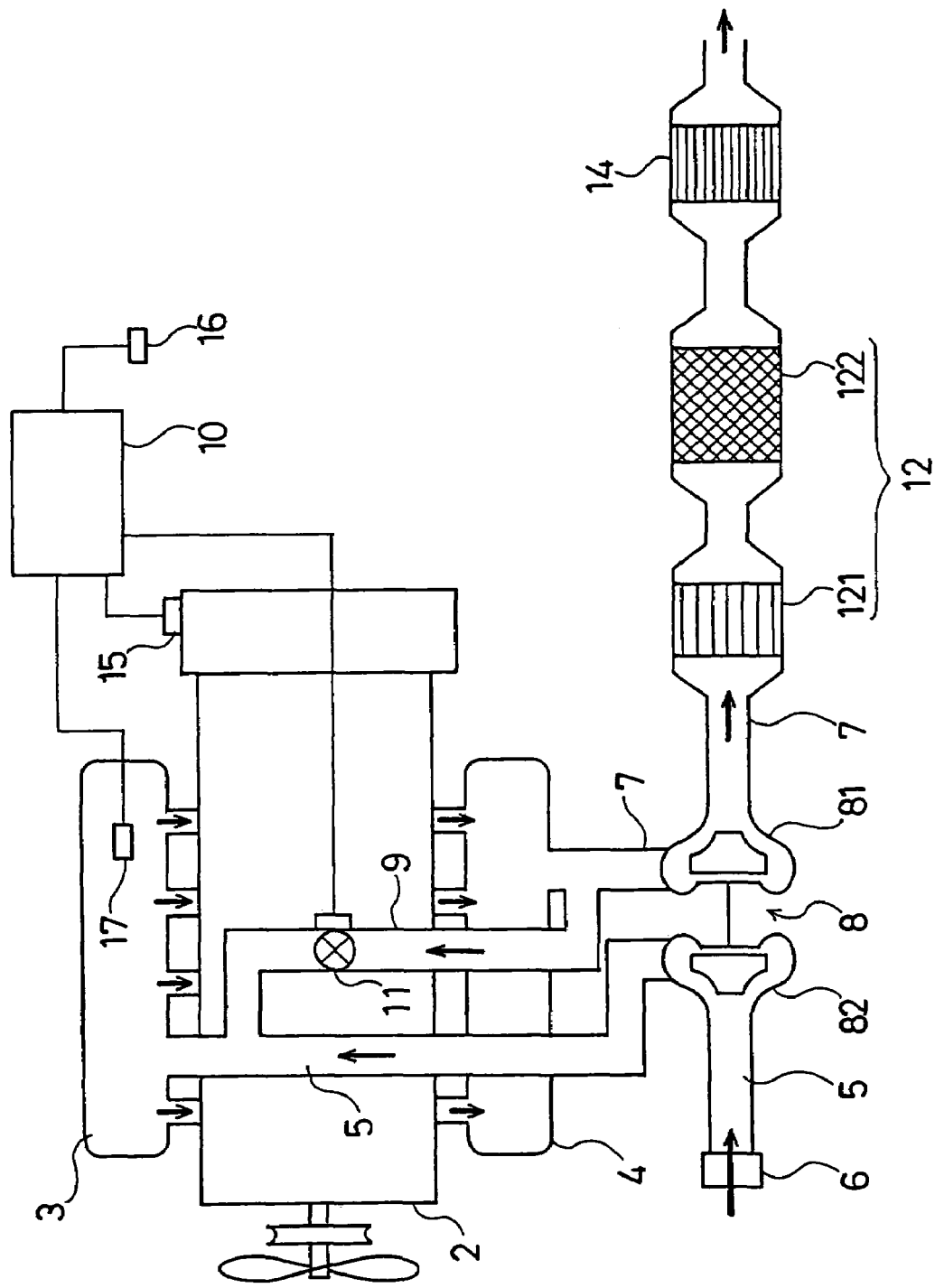
FIG. 12 shows a block diagram of an exhaust gas purifying equipment for a diesel engine of the prior art.
Figure 13:
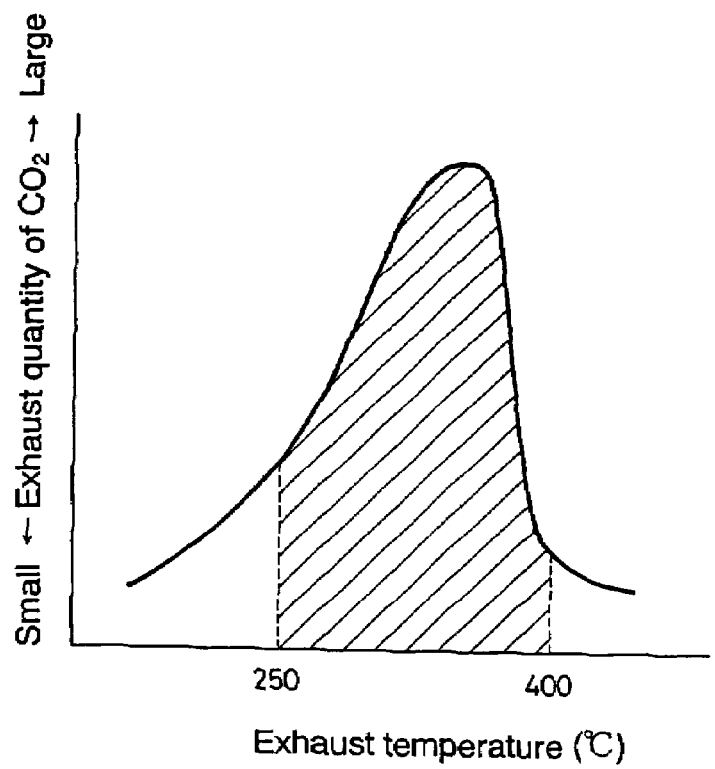
FIG. 13 shows the relation between exhaust temperature and exhaust quantity of $CO_2$ (PM combustion characteristics) in the continuous regeneration type DPF.
Figure 14:
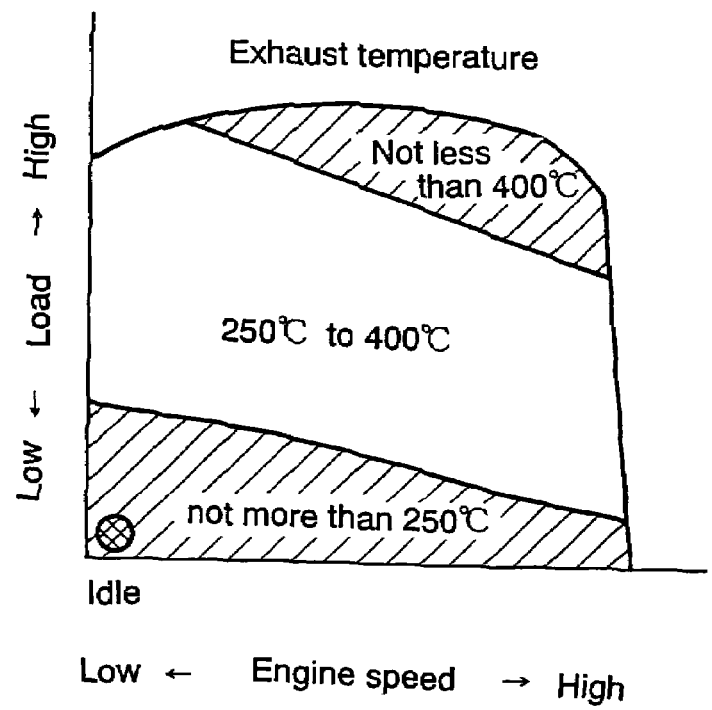
FIG. 14 shows the relation of an engine speed of a diesel engine and an exhaust temperature in respect to the engine load.

Now, a preferable embodiment of the present invention shall be described below using drawings. FIG. 1 is a schematic composition diagram showing an embodiment of an exhaust gas purifying equipment for a diesel engine composed according to the present invention. It should be appreciated that, in the embodiment shown in FIG. 1, component members same as those in the conventional exhaust gas purifying equipment shown in the aforementioned FIG. 12 are assigned with the identical numbers and detailed description thereof shall be omitted.

The exhaust gas purifying equipment for a diesel engine in the embodiment shown in FIG. 1 is provided with an intake valve (intake shutter) 22 disposed at the upstream of the connection of an EGR passage in the intake pipe 5 constituting a part of the intake passage for limiting the intake air quantity. This intake valve 22 is regularly kept full open. Besides, an exhaust valve (exhaust shutter) 23 for limiting a discharge of an exhaust gas is disposed downstream the connection part of the EGR passage 9 in the exhaust pipe 7 constituting a part of an exhaust passage. Similarly to the aforementioned intake valve 22, the exhaust valve 23 is also kept full open in a normal state. And the intake valve 22 and the exhaust valve 23 are provided, for example, with a negative pressure actuator connected to a negative pressure tank (not shown), and the opening thereof is controlled by the control means 10 controlling the negative pressure quantity supplied according to the operating state.

Figure 2:
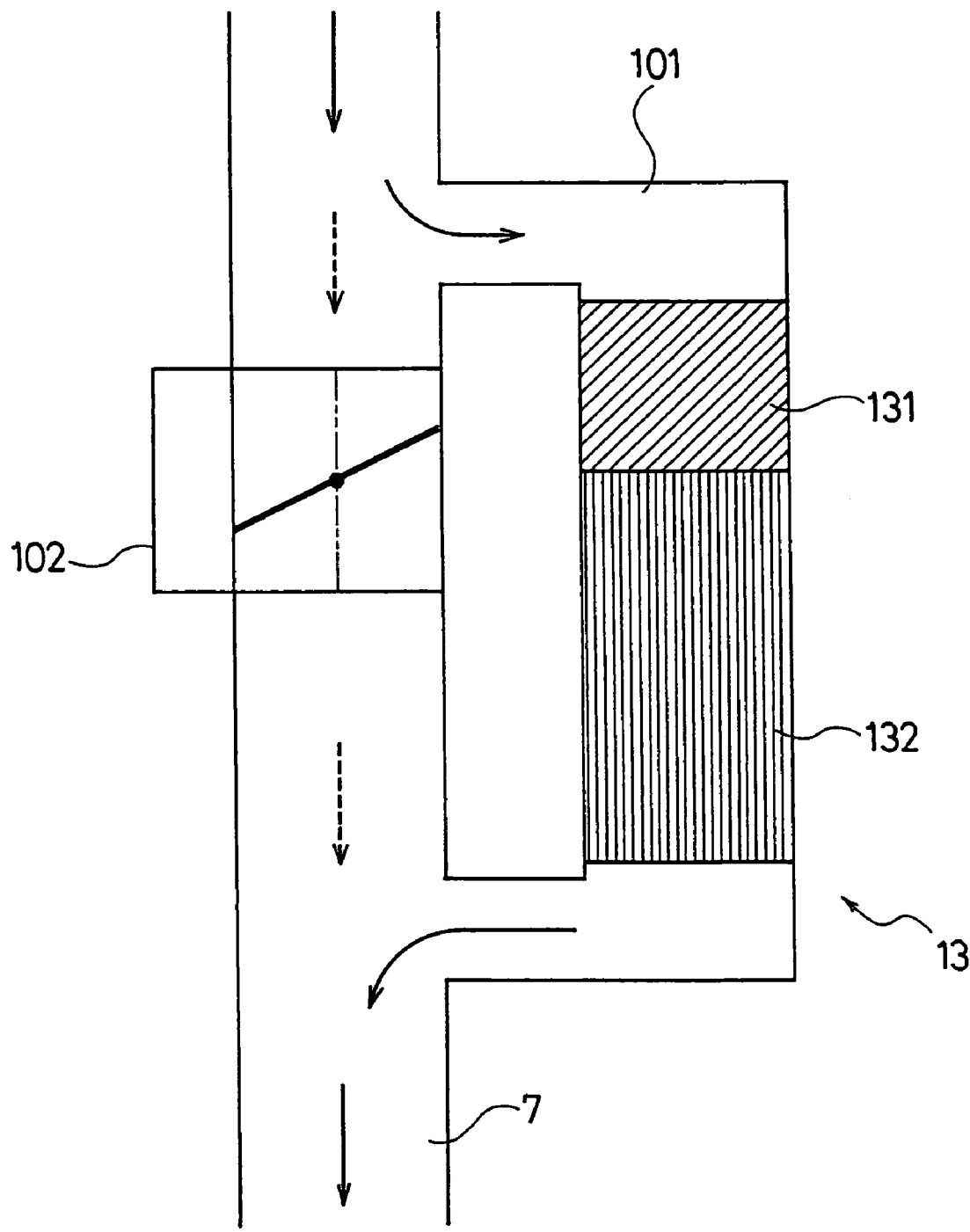
FIG. 2 is an enlarged view of a second continuous regeneration type diesel particulate filter shown in FIG. 1.

A bypass passage 101 bypassing the exhaust passage is disposed in the exhaust pipe 7 disposed immediately after the exhaust manifold 4 constituting a part of the exhaust passage. A second continuous regeneration type DPF 13 having an oxidation catalyst 131 and a particulate filter 132 is disposed in this bypass passage 101 as shown in FIG. 2, similar to the first continuous regeneration type DPF 12 having the aforementioned oxidation catalyst 121 and particulate filter 122. The capacity of the second continuous regeneration type DPF 13 is composed smaller than that of the first continuous regeneration type DPF 12. A switching valve (change-over valve) 102 for switching the flow path of an exhaust gas is disposed in the exhaust pipe 7 between the aforementioned bypass passages 101. The switching valve 102 is controlled by the control means 10. If the switching valve 102 is closed to stop the flow in the exhaust passage 7, an exhaust gas discharged from the exhaust manifold 4 flows in the bypass passage 101, namely in the second continuous regeneration type DPF 13.

Moreover, the diesel engine of the present embodiment adopts a common-rail system as a fuel injection system so that a retard (delay) of main injection, a post-injection (posterior injection) and the like can be executed precisely in the fuel injection into the cylinder.

Figure 3:
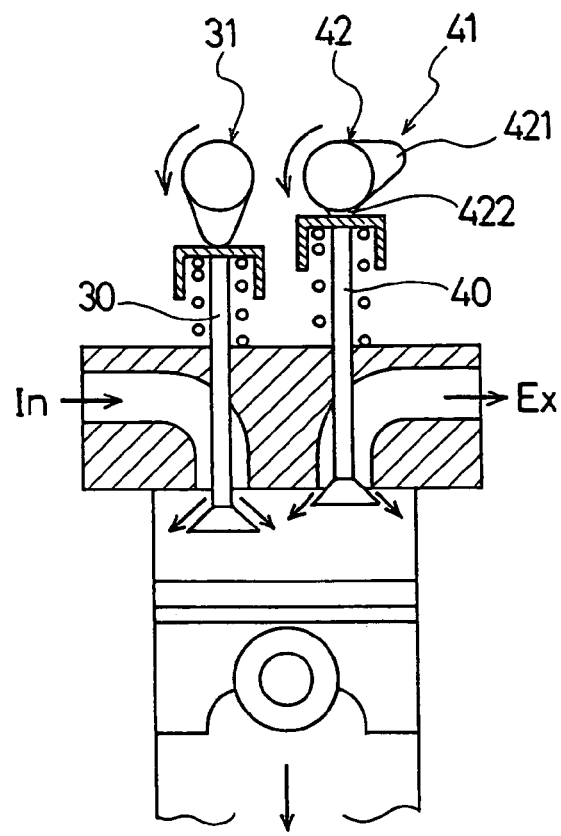
FIG. 3 shows an embodiment of an exhaust introduction mechanism according to the present invention.

The diesel engine of the present embodiment comprises an exhaust introduction mechanism to open the exhaust passage of the cylinder in the course of an intake stroke as shown in FIG. 3. FIG. 3 shows an intake valve 30 and an intake valve operation mechanism 31, and an exhaust valve 40 and an exhaust valve operation mechanism 41. An exhaust cam 42 constituting the exhaust valve operation mechanism 41 is provided with a normal cam profile 421 for operating the exhaust valve 40 in an exhaust stroke, and an exhaust introduction cam profile 422 formed with the phase angle of approximately 90 behind the rotation direction against the cam profile 421.

Figure 4:
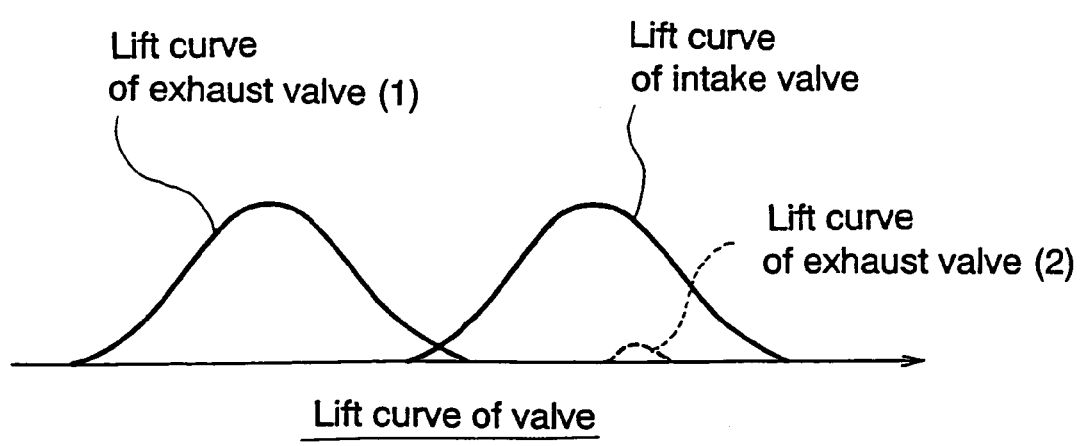
FIG. 4 shows lift curves of an intake valve and an exhaust valve in the composition of FIG. 3.

Thus composed exhaust cam 42 operates the exhaust valve 40 according to the lift curve of exhaust valve (1) by the cam profile 421 and the lift curve of exhaust valve (2) realized by the exhaust introduction cam profile 422 working during a short period of time of the intake stroke (in the lift curve of intake valve by the intake valve operation mechanism 31) as shown in FIG. 4.

Consequently, in the embodiment shown in FIG. 3, the exhaust introduction cam profile 422 formed in the exhaust cam 42 functions as an exhaust introduction mechanism for introducing an exhaust gas into the cylinder during the intake stroke. Besides, the lift amount of the exhaust valve 40 by the exhaust introduction cam profile 422 may be around 1 mm to 3 mm.

Figure 5:
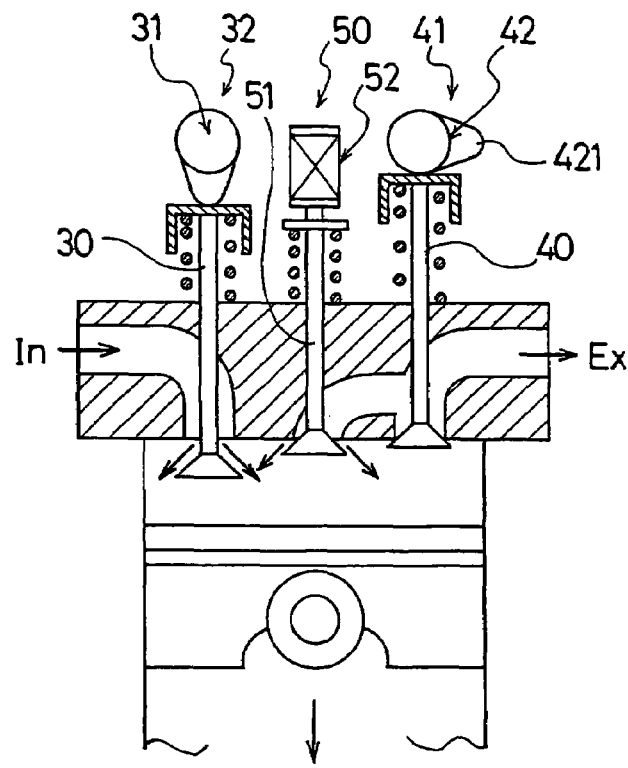
FIG. 5 shows another embodiment of the exhaust gas introduction mechanism according to the present invention.

Next, another embodiment of the exhaust introduction mechanism shall be described referring to FIG. 5. It should be appreciated that, in the embodiment shown in FIG. 5, members identical to the embodiment of FIG. 3 are assigned with the identical number, and the detail description thereof shall be omitted.

In the embodiment shown in FIG. 5, the exhaust cam 42 constituting the exhaust gas valve operation mechanism 41 is provided only with a normal cam profile 421. While in the embodiment shown in FIG. 4, the exhaust gas introduction mechanism 50 comprises an exhaust introduction valve 51 for opening the exhaust passage with the cylinder to the same cylinder during the intake stroke, and an electromagnetic solenoid 52 operating the exhaust gas introduction mechanism 50. In thus composed exhaust gas introduction mechanism 50, a control signal is sent from the control means 10 to the electromagnetic solenoid 52 and the exhaust introduction valve 51 is driven to open during the intake stroke, in the case where the engine exhaust temperature area is in the area of which the exhaust temperature is lower than that of a predetermined temperature area.

The embodiment shown in FIG. 1 comprises an exhaust temperature detection means for detecting the exhaust temperature area of a diesel engine. Now, descriptions about the exhaust temperature area detection means shall be made.

Figure 6:
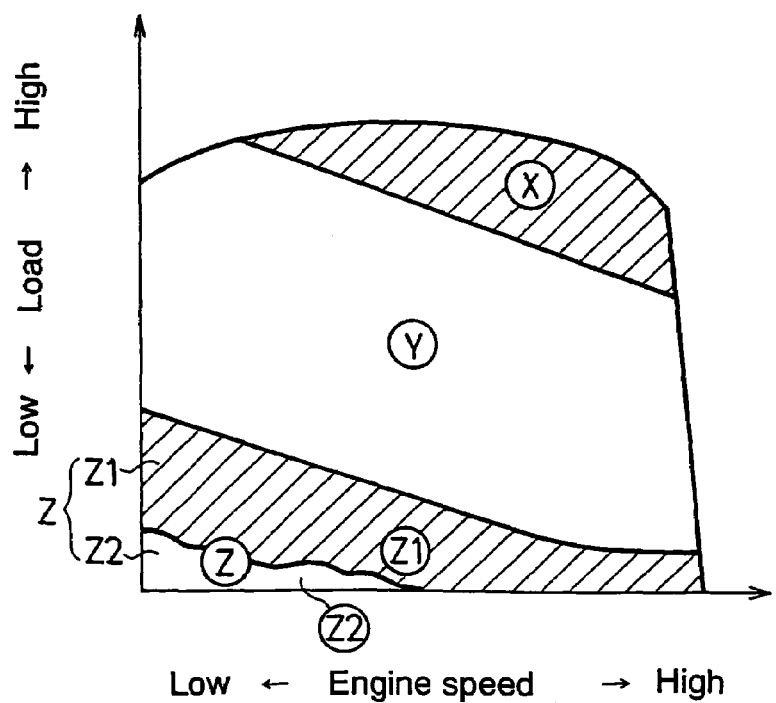
FIG. 6 shows an exhaust temperature area map according to the present invention.

The exhaust temperature of an engine is substantially decided mainly by the fuel injection quantity (the engine load) to be supplied to the engine and the engine speed. The control means 10 of the exhaust gas purifying equipment in the illustrated embodiment has an exhaust temperature area map taking an engine speed and an engine load as the parameter as shown in FIG. 6 in an internal memory (not shown) and detects in which area is the current exhaust temperature from the engine speed and the fuel injection quantity (the engine load). Otherwise, it may also so composed to judge to be in respective exhaust temperature area when the exhaust temperature is equal to or less than respective predetermined exhaust temperature by installing an exhaust temperature sensor. It should be appreciated that the area shown here indicates the temperature area of the exhaust temperature emitted from the cylinder.

Border lines of X, Y, Z shown in FIG. 6 are set referring mainly to test results concerning the engine exhaust temperature during the definition of the map and the active temperature area of the oxidation catalyst 121. The X area is an area of which the exhaust temperature is higher than that of the active temperature area of the oxidation catalyst 121, while the Y area is an area included in the active temperature area of the oxidation catalyst 121. Then, the Z area is an area of which the exhaust temperature is lower than that of the active temperature area of the oxidation catalyst 121. The Z area is further divided into Z1 area and Z2 area. The Z2 area is the area of which the exhaust temperature is still lower than that of the Z1 area, where an exhaust temperature comes down during an idling driving or an extremely light load driving in a very cold land, a highland and the like.

It goes without saying that the user can change these border lines conveniently according to the driving characteristics of the diesel engine to be adopted and the characteristics of the oxidation catalyst 121 to be adopted. Furthermore, the aforementioned areas are not necessarily limited to be divided into four area, they may either be further subdivided, or defined with three areas.

Figure 9:
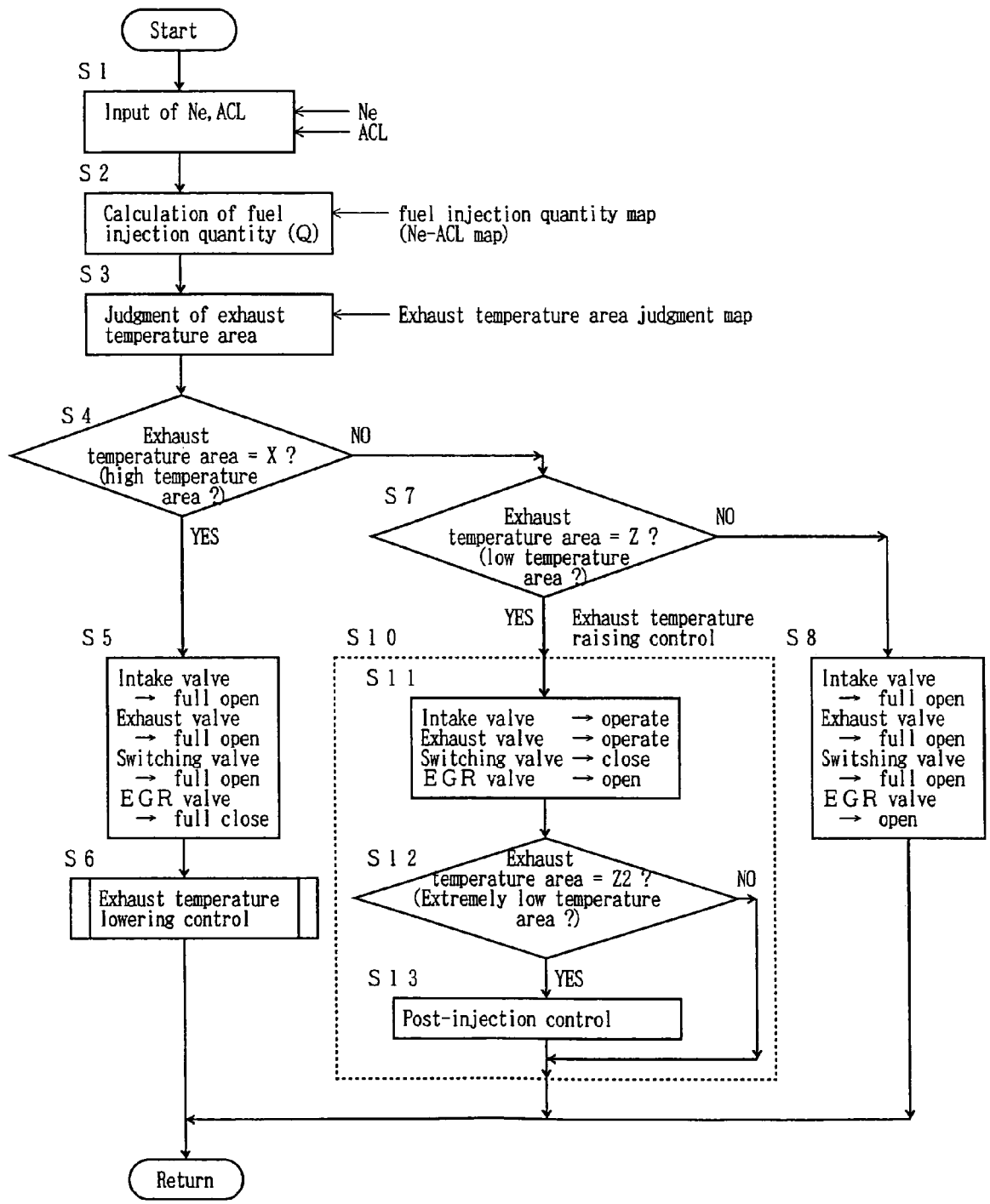
FIG. 9 shows a control flow chart of a control means according to the present invention.
Figure 15:
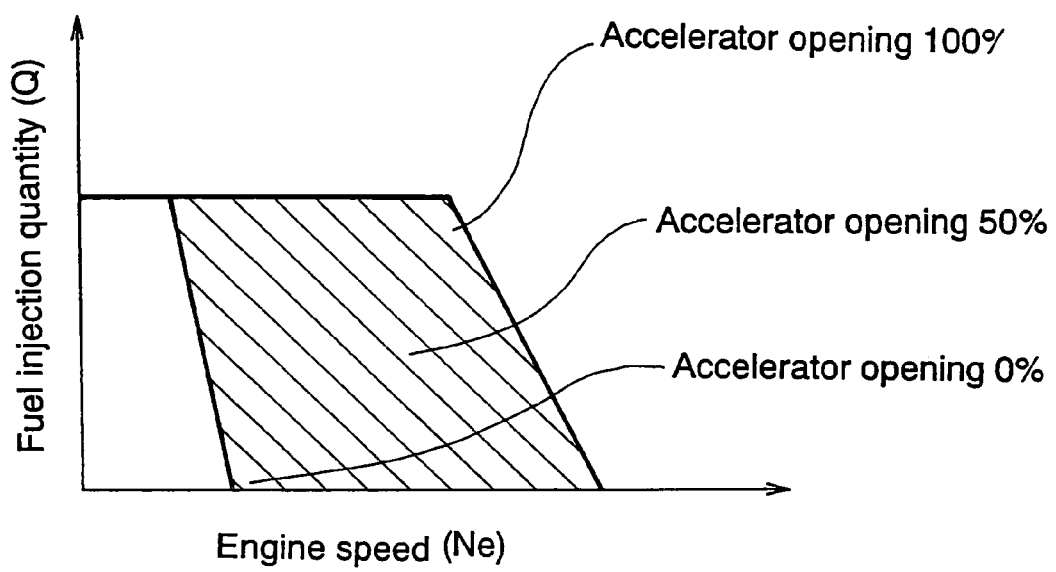
FIG. 15 shows a fuel injection quantity map for calculating a fuel injection quantity form an engine speed and an accelerator opening.

Next, an operation of the exhaust gas purifying equipment in the embodiment shown in FIG. 1 shall be described based on the flow chart shown in FIG. 9. When the engine starts, the engine is supplied with fuel by a fuel injection unit (not sown). The control means 10 input an engine speed signal (Ne) and accelerator opening signal (ACL) from the engine speed detection sensor 15 and the accelerator sensor 16 (step S1), and calculates the fuel injection quantity referring to a so-called fuel injection quantity map shown in FIG. 15 (step S2). At this moment, the control means 10 detects the fuel injection quantity as engine load Q.

In the exhaust gas purifying equipment of the embodiment shown in FIG. 1, the control means 10 detects the current exhaust temperature area from the engine load and the engine speed detected as mentioned above, based on the exhaust temperature area map shown in FIG. 6 as (step S3), when the engine load Q is detected as mentioned above. Thus, if the current exhaust temperature area is detected, the control means 10 controls the EGR valve 11, the intake valve 22 and the exhaust valve 23 which are aforementioned, according to the control map shown in FIG. 7 based on the current exhaust temperature area.

First, when the exhaust temperature area is in the active temperature area X of the oxidation catalyst in the judgment of the step S4, the control means 10 fully opens the intake valve 22, the exhaust valve 23 and the switching valve 102 according to the control map shown in FIG. 7 and fully closes the EGR valve 11 in the step S5. Then, the control means 10 executes the exhaust temperature lowering control in the next step S6. The exhaust temperature lowering control is, for example, the control of increasing the intake air quantity by the control of a variable turbocharger, the control of cooling the exhaust gas by the control of cooling water and the like. The description of the exhaust temperature lowering control shall be omitted as it is not a main characteristic mater of the present invention.

When the exhaust temperature area is out of X in the step S4, the step of the control means 10 proceeds to the step S7 from the step S4 to judge if the exhaust temperature area is in the low temperature area Z or not. There if judged not to be in the low temperature area Z (exhaust temperature area=Y), the step of the control means 10 proceeds to the step S8 to fully open the intake valve 22, the exhaust valve 23 and the switching valve 102. In this case, though the EGR valve 11 is opened, the control means 10 may executes the EGR control for a normal driving. It returns after this step S8.

If the exhaust temperature area is judged to be in the low temperature area (exhaust temperature area=Z), the step of the control means 10 proceeds to the steps S10 to perform the exhaust temperature raising control.

Figure 8:
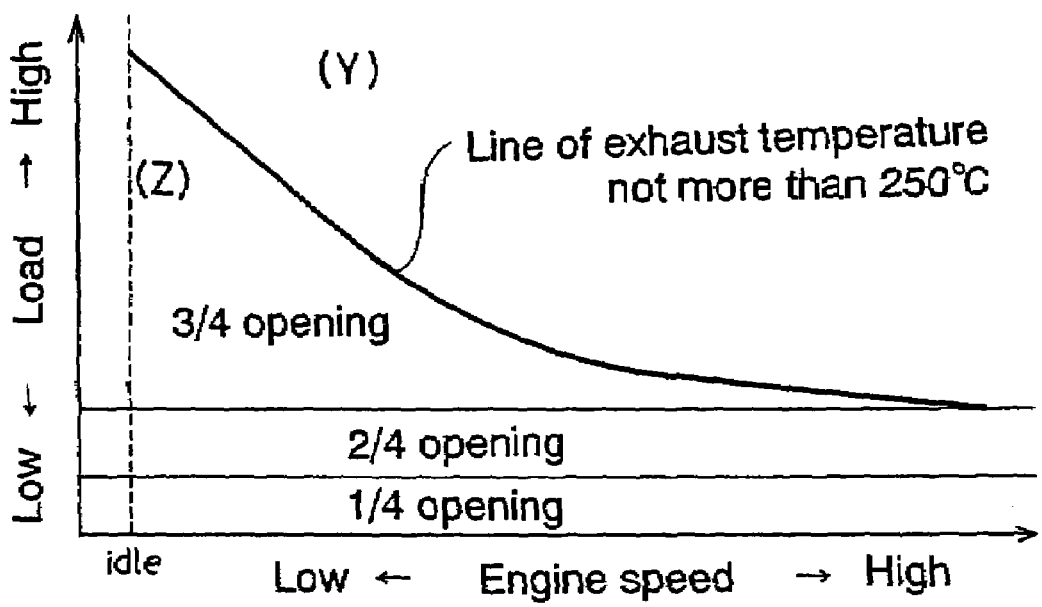
FIG. 8 shows an opening control map of an intake and an exhaust valves according to the present invention.
Figure 8:
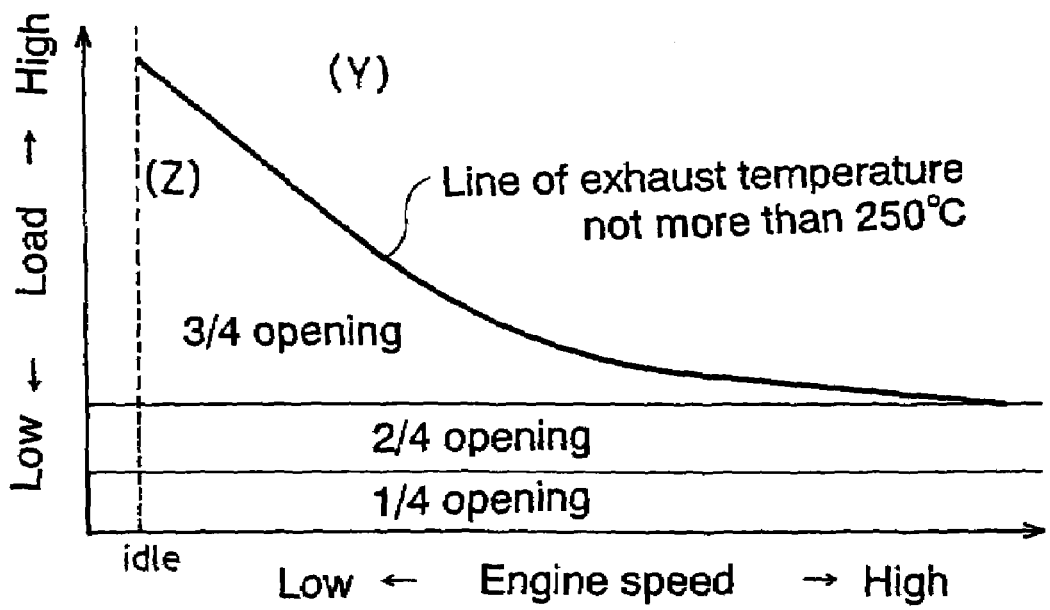

In the exhaust temperature raising control, at first in the step S11, the throttling control is performed to operate the intake valve 22 based on the intake valve opening map shown in FIG. 8 (*a*), and the throttling control of the exhaust valve 23 is performed to operate the exhaust valve 23 based on the exhaust valve opening map shown in FIG. 8 (*b*). Then, the switching valve 102 for switching the exhaust gas flow path to the bypass passage 101 is closed while the EGR valve 11 is opened.

It should be appreciated that both maps shown in FIG. 8 (*a*) and FIG. 8 (*b*) set the open operation of the intake/exhaust valve stepwise by further dividing the area of Z which is in the map used for the exhaust temperature detection means shown in FIG. 6. "¾ opening" means to be closed by ¼ in respect to the full open position while "¼ opening" to be closed by ¾.

Then, in the step S12 after the step S11, the exhaust temperature area is judged if it is in the extremely low temperature area Z2 in the low temperature area Z and, only when it is judged to be in the extremely low temperature area Z2, the step proceeds to the step S13 and further post-injection control is performed. It returns after the step S13.

Figure 10:
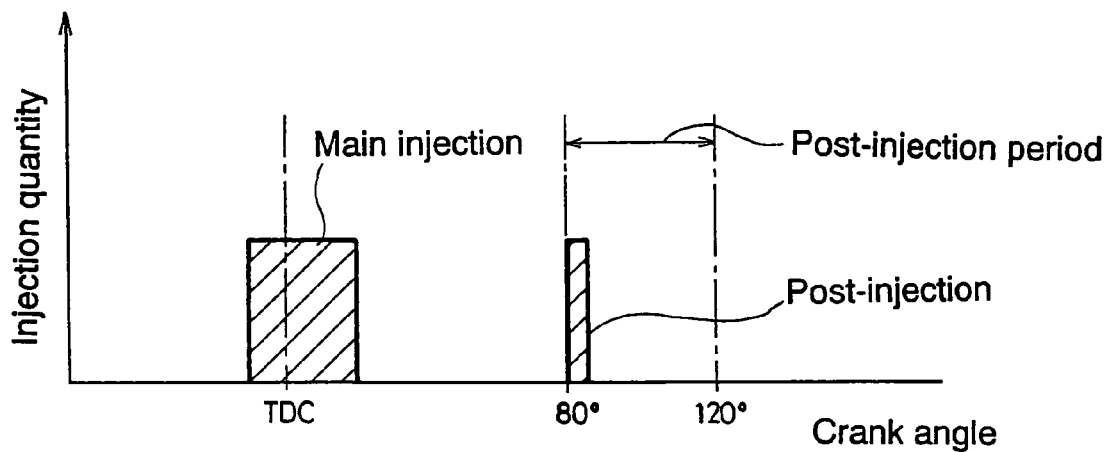
FIG. 10 shows a post-injection.

The post-injection is a control to burn PM up again completely by raising the exhaust temperature. There, as shown in FIG. 10. in addition to the main injection (primary injection), it is preferable to perform the post-injection retarding by the value from 80° to 120° in crank angle from the top dead center (TDC) of the piston, namely, in a range of 80° BTDC to 120° BTDC. And the post-injection quantity is preferably set to be in the range from 10% to 20% of the main injection quantity.

Figure 11:
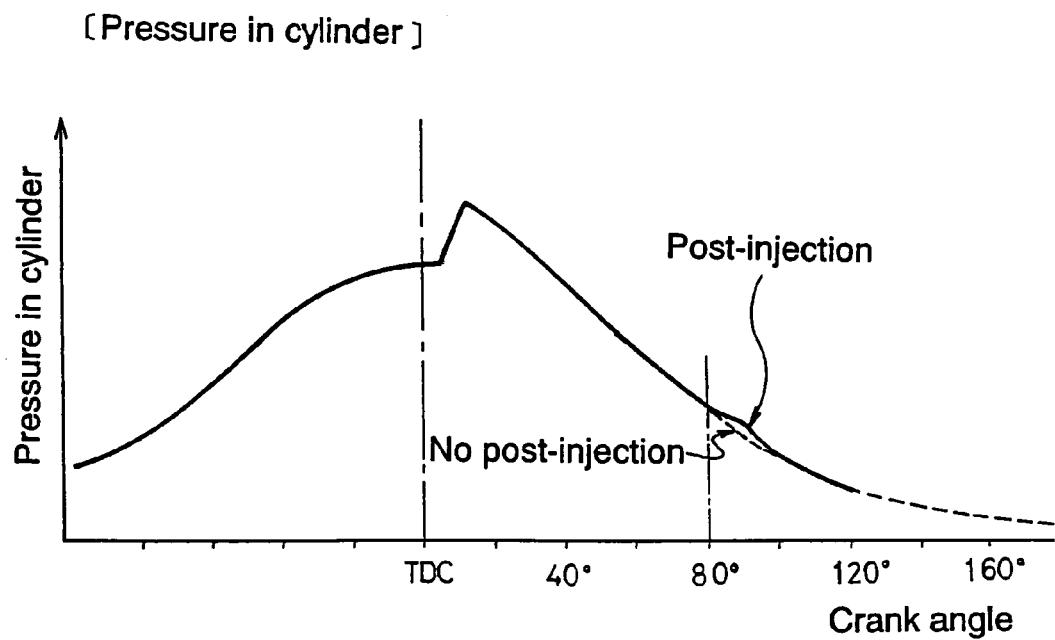
FIG. 11 shows the relation between post-injection and pressure in cylinder according to the present invention.

Because the post-injection is injected with the delay from 80° BTDC to 120° BTDC, the fuel injected by the post-injection hardly works to the piston in the cylinder, as shown in FIG. 11, and is emitted as a vaporized fuel. And, the fuel is supplied as an HC to be used by the oxidation catalyst 121 (FIG. 1), contributing to raise the exhaust temperature.

The step of the control in the control flow chart returns to the start, after performing the aforementioned controls.

In the case where the exhaust temperature area is in the low temperature area (exhaust temperature area=Z) as mentioned above, the EGR gas reflux quantity also increases, since new intake air is limited and the pressure in the exhaust passage in the proximity of the exit of the EGR passage 9 decreases by the throttling control of the intake valve 22. And, by performing a control to throttle the exhaust valve 23, the exhaust pressure of the connection portion between the exhaust pipe 7 constituting a part of the exhaust passage and the EGR passage 9 is raised, and the quantity of reflux EGR gas further increases.

Higher is the temperature of the exhaust gas, nearer is the excess air factor (λ) to 1 during the combustion in the cylinder and higher is the temperature of the intake air. Consequently, by performing the aforementioned controls, it becomes possible to raise the exhaust temperature to the active temperature area Y by raising the intake air temperature and by decreasing the new air quantity in the intake air, even in an operating range of a low engine speed and a low load where the exhaust temperature does not reach the active temperature area of the oxidation catalyst 121 normally.

As shown in the maps of FIG. 8(a) and FIG. 8(b) respectively, in a region where the exhaust temperature area is remote from the active temperature area Y of the oxidation catalyst, namely the lower exhaust temperature area, the control to throttle the intake valve 22 and the exhaust valve 23 is performed, resulting in the exhaust temperature to be raised furthermore. And, in the illustrated embodiment, the exhaust valve 40 is opened during the intake stroke to introduce the exhaust gas into the cylinder by the effect of the exhaust introduction cam profile 422 of the exhaust cam 42 constituting the exhaust introduction mechanism shown in FIG. 3.

Besides, in the case of being provided with an exhaust introduction mechanism 50 shown in FIG. 5, an electromagnetic solenoid 52 is driven during the intake stroke to open an exhaust introduction valve 51, and then the exhaust gas is introduced into the cylinder. Thus, in the case where the exhaust temperature area is in the low temperature area (exhaust temperature area=Z), a hot exhaust gas in the exhaust passage is made to flow back into the cylinder during the intake stroke, as a result, the exhaust temperature is made to raise. Moreover, in the case of performing such a control as to close the exhaust valve as mentioned above, since the exhaust pressure in the exhaust passage has become high, exhaust gas flowing back into the cylinder increases, making it possible to raise the exhaust temperature. Consequently, in the case where the exhaust temperature area is in the low temperature area (exhaust temperature area=Z), the control to throttle the intake valve 22 and the exhaust valve 23, and the operation of the exhaust introduction mechanism functions as the exhaust temperature raising means for raising the engine exhaust temperature.

Then, in the case where the exhaust temperature area is in the Z area, it is so controlled that the exhaust gas flows through the bypass passage 101, namely, second continuous regeneration type DPF 13, by operating the aforementioned exhaust temperature raising means and, at the same time, closing the switching valve 102 disposed in the exhaust pipe 7. The second continuous regeneration type DPF 13 is disposed substantially just downstream the exhaust manifold 4 to pass the exhaust gas through without lowering the exhaust temperature raised by the exhaust temperature raising means, affected by the atmosphere and the like. Thereby, such a conventional problem can be avoided that the exhaust temperature lowers below the active temperature area of the oxidation catalyst 121 of the first continuous regeneration type DPF 12 before reaching the first continuous regeneration type DPF 12 though it has been raised by the exhaust temperature raising means. In other words, the regeneration is always executed continuously at the same time during PM is collected, when at least the exhaust temperature area is in the Y area and in the Z area.

Then, according to this invention, the exhaust temperature can be raised even during the idling driving or extremely light load driving in a very cold land, a highland and the like, because the post-injection control is executed additionally in the case where the exhaust temperature area is in the Z2 area, which is an extreme low temperature area in the Z area. Therefore the PM accumulated in the DPF can be re-burned in all over the engine operating range.

A smaller capacity than the capacity of the first continuous regeneration type DPF 12 installed in the prior art is adopted for the second continuous regeneration type DPF 13. The second continuous regeneration type DPF 13 is used in where the exhaust temperature is low and the use thereof is restricted to a relatively low engine load (small injection fuel quantity) region. In other words, it is preferable that the capacity is made smaller, considering that the amount of the exhaust gas itself in the second continuous regeneration type DPF 13 is small, that the area in which the DPF 13 is to be used is the area in which the PM exists only fewer in the exhaust gas from the perspective of the whole operating area, and that it is disposed just downstream the exhaust manifold 4.

Hereinabove, in the illustrated present embodiment, though the exhaust temperature area is detected by means of an engine speed and an engine load, it is not limited to this, but it may also be detected by an exhaust temperature sensor 27 installed directly on the oxidation catalyst 121. Further, though it is described with the oxidation catalyst and the DPF to be formed separately in the foregoing description, it goes without saying that the present invention can also be applied to a continuous regeneration type DPF composed integrally by making the DPF directly support a material for the oxidation catalyst, or to a continuous regeneration type DPF made to support an NOx occlusion reduction type catalyst and, furthermore, to other continuous regeneration type DPF using a catalyst with a limited effective functioning temperature area, similar to the foregoing description. It should be appreciated that, though it is described that both the EGR passage 9 and the exhaust introduction mechanism are to be installed, the EGR passage 9 is not always indispensable. Especially, in the case of installing an exhaust introduction mechanism, the EGR passage 9 may be omitted.

What is claimed is:

1. An exhaust gas purifying equipment for an engine comprising:
    a first filter disposed in an exhaust passage of the engine;
    a second filter disposed in a bypass passage upstream of the first filter;
    a detector detecting the exhaust temperature area of the engine;
    a switching valve; and
    a controller controlling an exhaust temperature and the switching valve in correspondence to the exhaust temperature area of the engine detected by the detector,
    the controller executing a post-injection, and furthermore controlling the switching valve so that the exhaust gas passes through the second filter, in the case where the exhaust temperature area of the engine detected by the detector is an extremely low temperature area of which the exhaust temperature is lower than that of a predetermined temperature area,
    wherein the second filter has a capacity which is smaller than that of the first filter, and the second filter is disposed downstream of the exhaust manifold.

2. An exhaust gas purifying equipment for a diesel engine, comprising:
    a first continuous regeneration type diesel particulate filter disposed in an exhaust passage of an engine;
    a bypass passage bypassing the exhaust passage at the upstream of the first continuous regeneration type diesel particulate filter;
    a second continuous regeneration type diesel particulate filter disposed in the bypass passage;
    a switching valve for switching the flow path of an exhaust gas disposed in said exhaust passage between the bypass passages;
    exhaust temperature raising means for raising the exhaust temperature of the engine;
    exhaust temperature area detection means for detecting the exhaust temperature area of the engine; and
    control means for controlling the exhaust temperature raising means and the switching valve in correspondence to the exhaust temperature area of the engine detected by the exhaust temperature area detection means,
    the control means operating the exhaust temperature raising means, executing a post-injection, and furthermore controlling the switching valve so that the exhaust gas passes through the second continuous regeneration type diesel particulate filter, in the case where the exhaust temperature area of the engine detected by the exhaust temperature area detection means is an extremely low temperature area of which the exhaust temperature is lower than that of a predetermined temperature area,
    wherein the second continuous regeneration type DPF has a capacity which is composed smaller than that of the first continuous regeneration type DPF and the second continuous regeneration type DPF is disposed substantially just downstream of the exhaust manifold.

3. The exhaust gas purifying equipment for the diesel engine in claim 2,
    wherein the control means operates the exhaust temperature raising means and at the same time, without executing the post-injection control, controls the switching valve so that the exhaust gas passes through the second continuous regeneration type diesel particulate filter, in the case where the exhaust temperature area of the engine detected by the exhaust temperature area detection means is in the low temperature area, but in the area of which the exhaust temperature is higher than that of the extremely low temperature area.

4. The exhaust gas purifying equipment for a diesel engine in claim 2,
    wherein the post-injection is performed in the range of 80° BTDC to 120° BTDC.

5. The exhaust gas purifying equipment for a diesel engine in claim 2,
    wherein the post-injection quantity is set to 10% to 20% of the main injection quantity.

* * * * *